United States Patent
Cannon et al.

(10) Patent No.: US 6,836,280 B2
(45) Date of Patent: Dec. 28, 2004

(54) COLLIMATION ASSEMBLY AND METHODS AND APPARATUS FOR CALIBRATING COLLIMATION AND PRE-SCAN ASSEMBLIES IN A LASER SCANNING UNIT

(75) Inventors: Roger Cannon, Lexington, KY (US); Christopher Chee, Lexington, KY (US); Robert Paterson, Nicholasville, KY (US)

(73) Assignee: Lexmark International, Inc., Lexington, KY (US)

( * ) Notice: Subject to any disclaimer, the term of this patent is extended or adjusted under 35 U.S.C. 154(b) by 166 days.

(21) Appl. No.: 10/235,354

(22) Filed: Sep. 5, 2002

(65) Prior Publication Data

US 2004/0047389 A1 Mar. 11, 2004

(51) Int. Cl.[7] .............................................. G02B 26/08
(52) U.S. Cl. ....................................... 347/242; 347/257
(58) Field of Search ................................. 347/241–243, 347/245, 256–261, 263

(56) References Cited

U.S. PATENT DOCUMENTS

| | | | |
|---|---|---|---|
| 4,578,688 A | | 3/1986 | Okuno |
| 5,646,767 A | | 7/1997 | Iima et al. |
| 5,905,751 A | | 5/1999 | Huang et al. |
| 6,005,703 A | * | 12/1999 | Maddox et al. ............. 359/206 |
| 6,671,107 B2 | * | 12/2003 | Chee .......................... 359/819 |
| 2003/0222967 A1 | * | 12/2003 | Chee et al. ................. 347/243 |

* cited by examiner

Primary Examiner—Huan Tran
(74) Attorney, Agent, or Firm—John A. Brady

(57) ABSTRACT

A collimation assembly for use in a laser scanning unit is provided. Methods for aligning collimation and pre-scan assemblies in a laser scanning unit are further provided. Also provided are alignment structures for use in aligning collimation and pre-scan assemblies in a laser scanning unit.

4 Claims, 10 Drawing Sheets

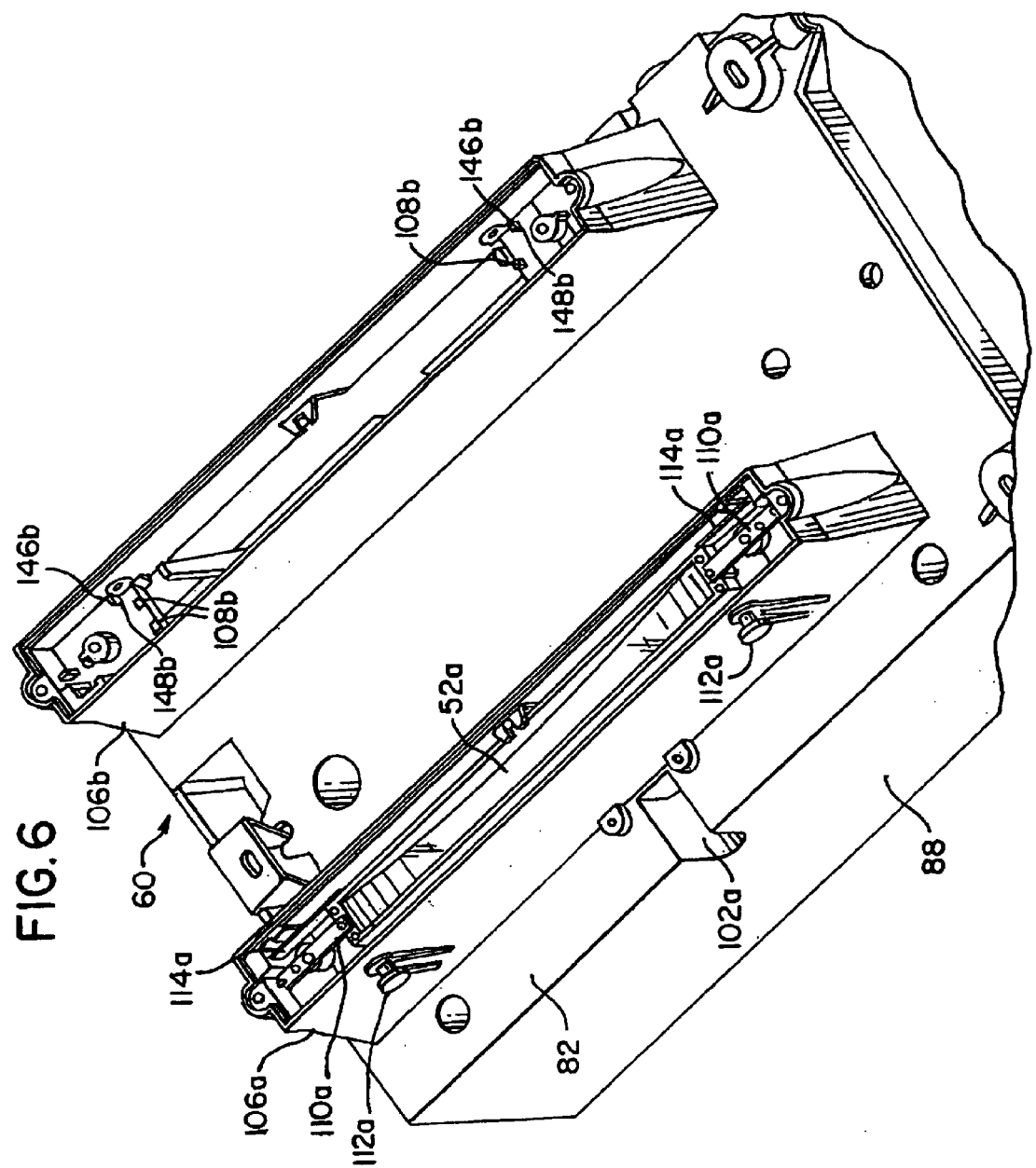

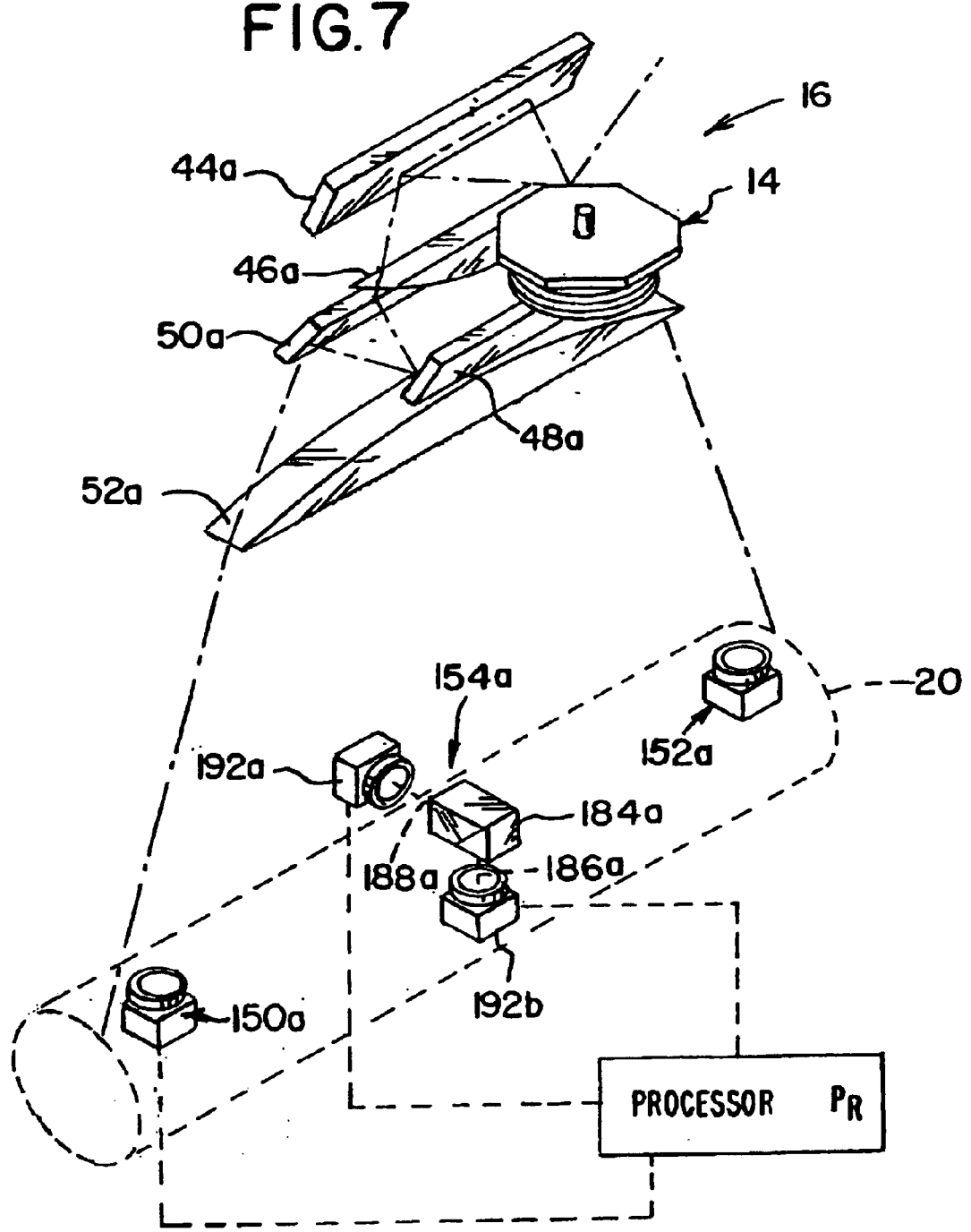

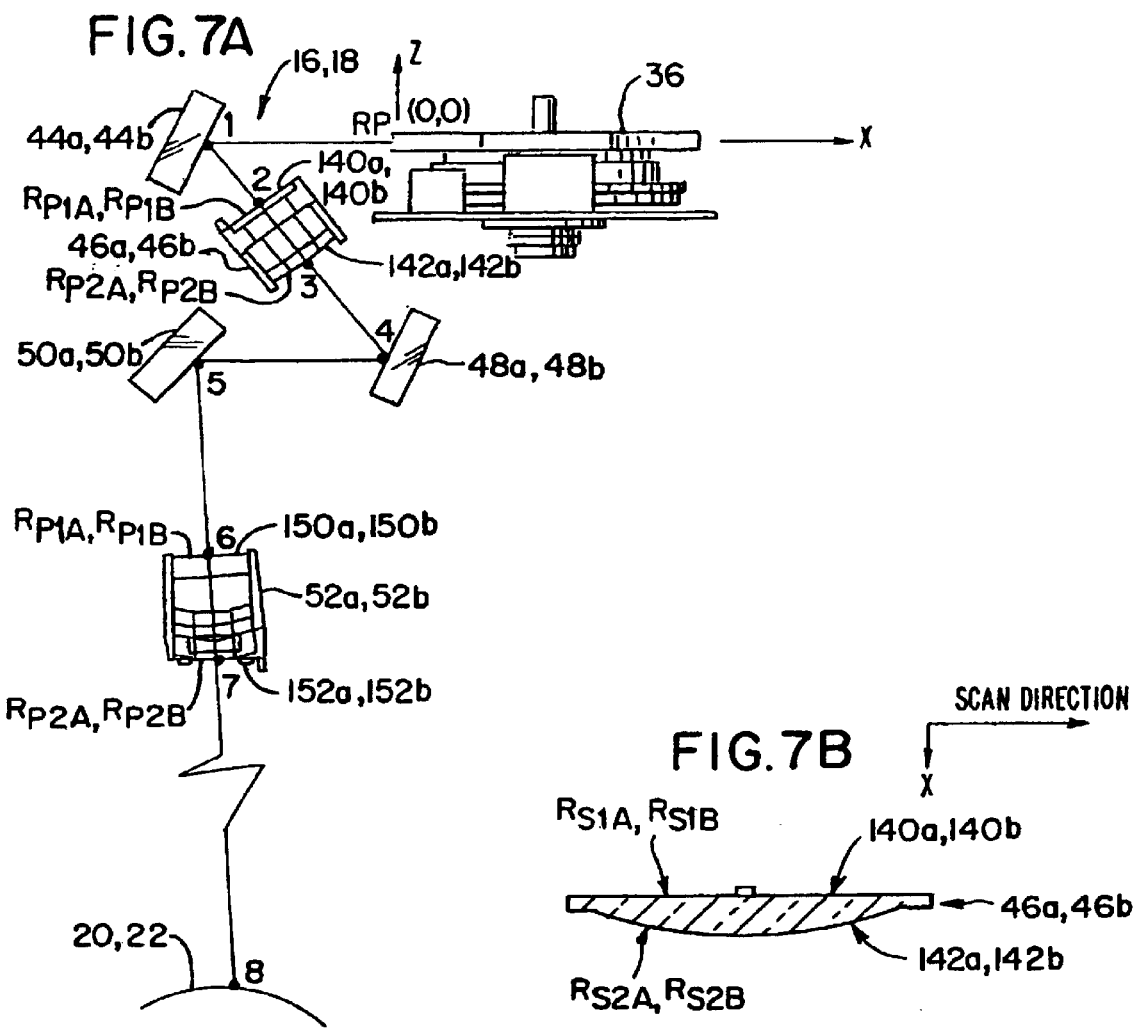
FIG. 7A
FIG. 7B
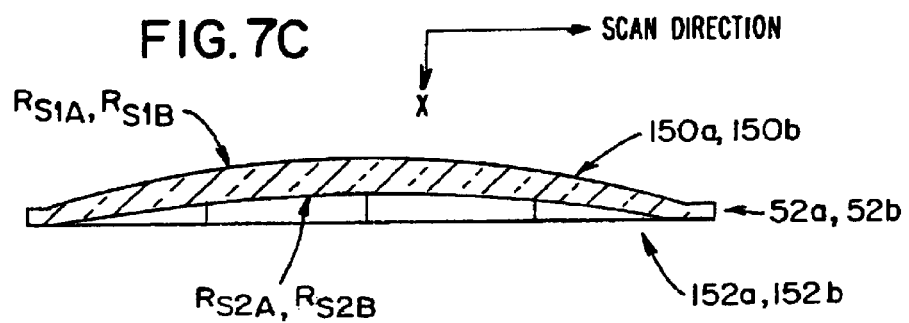
FIG. 7C

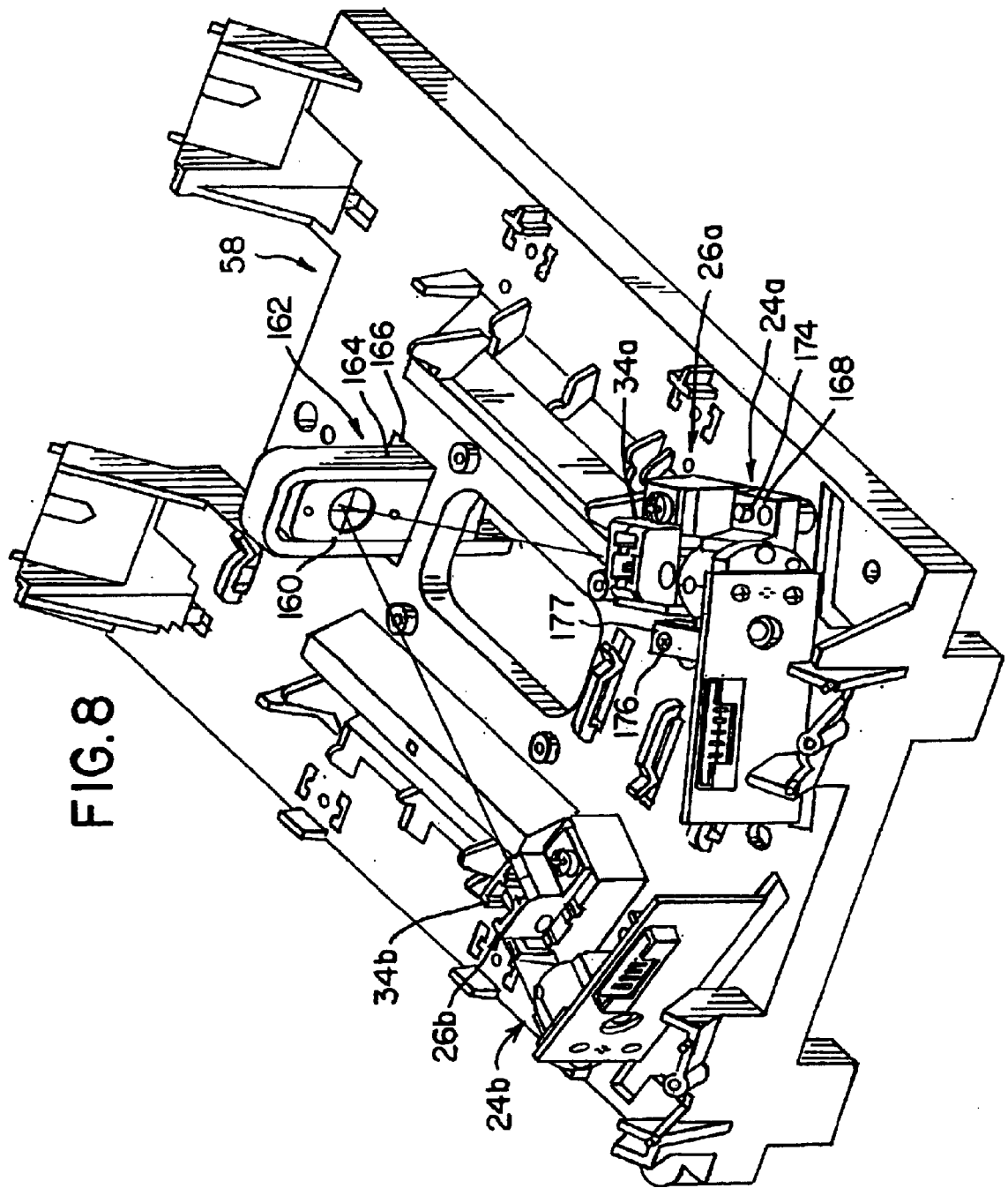

COLLIMATION ASSEMBLY AND METHODS AND APPARATUS FOR CALIBRATING COLLIMATION AND PRE-SCAN ASSEMBLIES IN A LASER SCANNING UNIT

RELATED APPLICATION

This application is related to commonly assigned U.S. patent application Ser. No. 10/235,382, entitled "LASER SCANNING UNIT AND METHOD AND APPARATUS FOR CALIBRATING A POST-SCAN ASSEMBLY IN A LASER SCANNING UNIT"; filed concurrently herewith; the disclosure of which is incorporated herein by reference.

TECHNICAL FIELD AND INDUSTRIAL APPLICABILITY OF THE INVENTION

The present invention relates to laser scanning devices and, more particularly, to a laser scanning unit, a collimation assembly for use in a laser scanning unit and methods and apparatus for aligning the optical elements of one or more laser diode/pre-scan optical assemblies of a laser scanning unit.

BACKGROUND OF THE INVENTION

Optical systems used in laser printers may be characterized as having three sub-systems or assemblies, namely, a laser diode/pre-scan optical assembly, a scanning assembly, and a post-scan assembly. Typically, the laser diode/pre-scan optical assembly includes a laser diode emitting a diverging laser beam, a collimator lens for collimating the beam emitted by the laser diode, and a pre-scan lens to focus the beam to a waist near the scanning device so that the post-scan assembly images the beam to a waist at a corresponding photoconductive (PC) drum surface.

The scanning assembly generally includes a scanning device such as a motor driven, rotatable polygon mirror having a plurality of peripheral mirror surfaces or facets that rotate during operation of the printer. The mirror surfaces reflect the collimated and focused beam received from the laser diode/pre-scan optical assembly. The direction of rotation of the polygon mirror determines the scan direction of the beam passing along a scanned object, such as a PC drum in a laser printer.

During a calibration procedure, the collimator lens must be properly aligned so that the beam exiting the collimator lens is properly position in process and scan directions. Further, a pre-scan lens must be properly positioned so that the laser beam waist is substantially located in the process direction, transverse to the scan direction, at the surface of a corresponding PC drum.

In a known laser diode/pre-scan optical assembly for a laser scanning unit, supporting structure is provided for mounting pre-scan lens structure comprising a pre-scan lens, and a laser diode/collimation assembly structure comprising laser diode and a collimator lens. The supporting structure is formed with precisely located mounting points held to close tolerances which accurately align the pre-scan lens structure and laser diode/collimation assembly structure to produce a laser beam output spatially oriented to a predetermined location and including the formation of a beam waist at a desired point relative to a corresponding PC drum surface. A certain degree of alignment of the pre-scan lens is provided by taking a physical measurement of the position of the pre-scan lens or its carrier relative to a reference feature formed on the supporting structure. While such an alignment procedure provides relatively accurate alignment of the pre-scan lens, it does not compensate for variations in the beam resulting from variations in the physical characteristics of the pre-scan lens, such as minor variations in thickness or aberrations in the pre-scan lens which may affect the character of the beam passing therethrough. Typically, the collimation assembly is merely secured to the housing without any alignment steps being performed. However, a known alignment procedure, performed as a repair operation, involves directing a video camera to a downstream optical component, such as a mechanical target, so that the location of the beam spot can be visually observed by an operator on a monitor. The operator then installs shims as necessary to the mounting points for the collimation assembly to locate the beam at a desired observed location on the mechanical target.

Accordingly, there remains a need for an optical system for a laser scanning unit in which the optical components of one or more of the laser diode/pre-scan optical assemblies may be readily aligned. In particular, there is a need for methods and alignment structure for aligning the optical components of each laser diode/pre-scan optical assembly in which the location of the beam produced by the laser diode/pre-scan optical assembly may be accurately determined and in which the optical components comprising the laser diode/pre-scan optical assembly may be readily adjusted.

SUMMARY OF THE INVENTION

A first aspect of the invention will now be described. In a laser scanning unit comprising a housing, and a laser diode for generating a laser beam, a collimation assembly comprising: a collimator lens; a collimation structure for supporting the collimator lens and an adjustable element provided for moving the collimation structure relative to the housing. The structure is adjustable relative to the housing so as to reposition the laser beam in first and second directions which are substantially perpendicular to one another.

The collimation structure is movable about a first axis which is substantially parallel to a scanning axis about which a scanning device adapted to be mounted in the housing is pivotally movable. Adjustment of the collimation structure about the first axis causes the beam to move in the first direction defining a scan direction. The collimation structure is movable about a second axis which is substantially perpendicular to the scanning axis and adjustment of the collimation structure about the second axis causes the beam to move in the second direction defining a process direction.

The collimation structure includes a first opening for receiving a pin defining a first axis about which the collimation structure may move for repositioning the beam in the first direction. The pin may comprise fixture structure. The fixture structure may comprise a portion of the housing or separate structure from the housing which is insertable into an opening provided in the housing.

The adjustable element may comprise a spring-biased spacer which preferably biases the collimation structure in a direction away from the housing so as to allow the beam to be repositioned in the second direction. The spring-biased spacer may comprise a belleville washer. It is also contemplated that the adjustable element may comprise a jack screw.

A second aspect of the present invention is as follows. In a laser scanning unit comprising a housing, a first laser diode for generating a laser beam, and a first collimation assembly for substantially collimating the laser beam and being movable relative to the housing, an alignment structure is provided for aligning the collimation assembly within the housing comprising: an alignment mount capable of being positioned adjacent to the housing; and an alignment sensor mounting to the alignment mount. The alignment sensor provides an indication of the location of a laser beam generated by the laser diode and passing through the collimation assembly in first and second directions. The first direction may be substantially perpendicular to the second direction.

The alignment mount may extend through an opening in the housing and is located along a line extending from the collimation assembly to said opening. The alignment sensor may comprise a quadcell sensor for sensing the location of the beam along two perpendicular axes.

The alignment structure may include a second laser diode for generating a second laser beam, and a second collimation assembly for substantially collimating the second laser beam and being movable relative to the housing. The alignment sensor further provides an indication of the location of the second laser beam.

In accordance with a third aspect of the present invention, a method is provided for aligning a collimation structure in a laser scanning unit comprising a housing, a first laser diode for generating a first laser beam, a first collimation assembly including the first collimation structure and a first collimator lens supported by the first collimation structure for substantially collimating the first laser beam, the method comprises the steps of: providing a sensor for detecting the position of a laser beam originating from the first laser diode and collimated by the first collimator lens, the sensor sensing the position of the beam in first and second directions; and adjusting the position of the first collimation structure to locate the laser beam at a predetermined location on the sensor.

The step of adjusting may comprise causing the laser beam to be repositioned in at least one of the first and second directions.

The laser scanning unit housing is adapted to receive a scanning assembly including a scanning device and the step of adjusting is preferably performed prior to the scanning assembly being located in the housing.

The scanning unit may further comprise a second laser diode for generating a second laser beam, a second collimation assembly including a second collimation structure and a second collimator lens supported by the second collimation structure for substantially collimating the second laser beam. The sensor may sense the position of the second laser beam. The method may further comprise the step of adjusting the position of the second collimation structure to locate the second laser beam at a predetermined location on the sensor.

A fourth aspect of the present invention will now be described. In a laser scanning unit comprising a housing, a scanning assembly including a scanning device, a laser diode for generating a laser beam, a collimation assembly for substantially collimating the laser beam and a pre-scan structure comprising a pre-scan lens carrier including a pre-scan lens supported for movement relative to the housing, an alignment structure for aligning the pre-scan lens carrier comprising: a beam splitter located along the path of a laser beam originating from the laser diode and passing through the collimation assembly and the pre-scan lens, the beam splitter forming the laser beam into first and second beam portions; and first and second sensors for sensing a spot size of each of the first and second beam portions, a desired position for the pre-scan lens carrier is determined based on the spot sizes (i.e., cross-section areas of the first and second beam portions) of the first and second beam portions.

The alignment structure may further comprise a processor for determining a location of a waist of the laser beam relative to a known location of a surface of a corresponding photoconductive member based on the spot sizes of the first and second beam portions.

In accordance with a fifth aspect of the present invention, a method is provided for adjusting a pre-scan lens in a laser scanning unit comprising a housing, a scanning assembly including a scanning device, a laser diode for generating a laser beam, a collimation assembly for substantially collimating the laser beam and a pre-scan structure comprising the pre-scan lens which is supported for movement relative to the housing, the method comprises the step of positioning a beam splitter in the path of a laser beam originating from the laser diode and passing through the collimation assembly and the pre-scan lens. The beam splitter forms the laser beam into first and second beam portions. The method further comprises the steps of providing first and second spaced-apart sensors for sensing the spot size of each of the first and second beam portions and moving the pre-scan lens relative to the housing to obtain a laser beam waist at a predetermined location.

The method may further comprise the step of determining a location of the waist of the laser beam relative to a known location of a surface of a corresponding photoconductive member based on the sensed spot sizes of the first and second beam portions.

BRIEF DESCRIPTION OF THE DRAWINGS

FIG. 6 is a perspective view of a lower surface or side of the lower housing portion of the laser scanning unit of FIG. 2;

FIG. 7 is a perspective view of a post-scan optical assembly removed from a scanning unit housing and illustrating camera units of a calibration arrangement for use in adjusting bow and process position of a scan line generated by a compensated scanning beam output by the post-scan optical assembly;

FIG. 7A is a view of a post-scan optical assembly removed from a scanning unit housing and illustrating locations of specific points along an optical path defined by the components of the post-scan assembly;

FIG. 7B is a cross-sectional view of a first f-theta lens;

FIG. 7C is a cross-sectional view of a second f-theta lens;

FIG. 8 is a perspective view of a laser scanning unit with components not yet assembled thereto and illustrating a quad cell sensor for use in aligning collimation assemblies provided on the scanning unit housing;

DETAILED DESCRIPTION OF THE PREFERRED EMBODIMENTS

Figure 1:
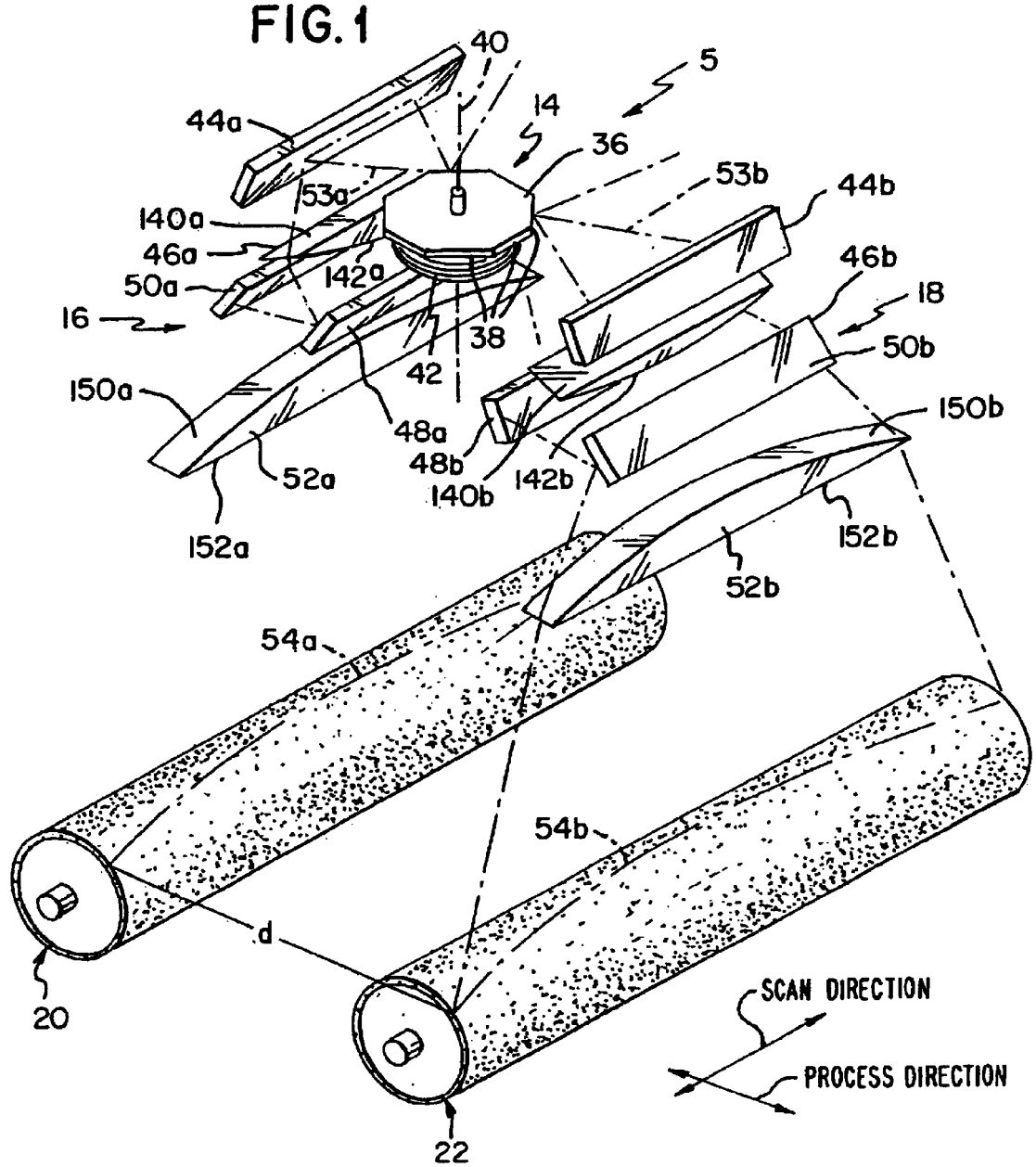
FIG. 1 is a perspective view of the scanning assembly and first and second post-scan optical assemblies removed from a housing of a laser scanning unit of the present invention.
Figure 2:
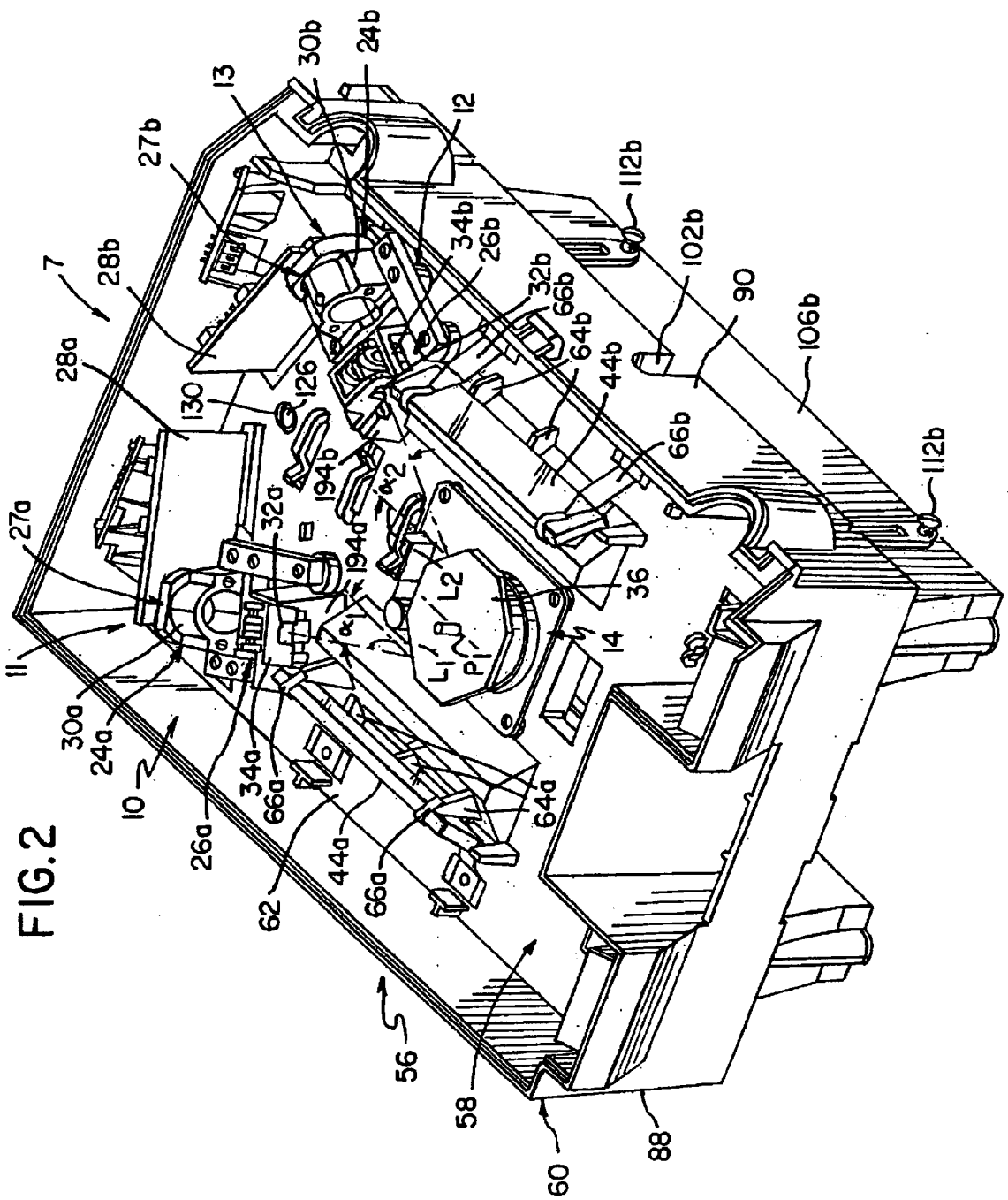
FIG. 2 is a perspective, top view of a laser scanning unit of the present invention.

With reference to FIGS. 1 and 2, an optical system 5 for a laser scanning unit 7 of the present invention is illustrated, and includes a first light beam source 10, see FIG. 2, a second light beam source 12, a scanning assembly 14, and first and second post-scan optical assemblies 16, 18, see FIG. 1. In the illustrated embodiment, the first light beam source 10 comprises a first laser diode/pre-scan optical assembly 111 and the second light beam source 12 comprises a second laser diode/pre-scan optical assembly 13. It should be noted that the first and second laser diode/pre-scan optical assemblies 11, 13 include substantially the same components and the first and second post-scan optical assemblies 16, 18 include substantially the same components, and similar components of the first and second laser diode/pre-scan optical assemblies and post-scan optical assemblies are labeled with similar numbers having suffixes "a" and "b" to distinguish between the components of corresponding assemblies.

The first and second post-scan optical assemblies 16, 18 output compensated scanning beams which generate scan lines 54a and 54b on respective photoconductive drums 20, 22, see FIG. 1. It is contemplated that two scanning units 7 may be used in combination in a color laser printer in order to generate four latent images on four corresponding PC drums. The four latent images are developed by developing apparatus (not illustrated) so as to generate four toner images, e.g., yellow, cyan, magenta and black toner images, which are registered to one another to form a composite toner image.

The first and second laser diode/pre-scan optical assemblies 11, 13 are located on the same diametric side of the scanning assembly 14, see FIG. 2. Each assembly 11, 13 includes a laser diode/collimation assembly structure 24a, 24b and a pre-scan lens structure 26a, 26b. Each laser diode/collimation assembly structure 24a, 24b includes a laser driver card 28a, 28b mounted to a collimation housing 30a, 30b. A collimator lens (not shown) is provided in each collimation housing 30a, 30b. The collimation housing 30a and corresponding collimator lens define a first collimation assembly 27a and the collimation housing 30b and corresponding collimator lens define a second collimation assembly 27b. Each driver card 28a, 28b comprises a laser diode (not shown) for producing a laser beam which passes through a corresponding collimator lens. The collimator lenses function to substantially collimate the laser beams emitted from the diodes. It should be noted that throughout the present description of the invention and the appended claims, reference to a collimated laser beam and substantially collimated laser beam includes beams which are slightly diverging, beams which are slightly converging, as well as beams having parallel rays.

Each pre-scan lens structure 26a, 26b comprises a pre-scan lens 32a, 32b provided in a carrier 34a, 34b. Further, each carrier 34a, 34b comprises an elliptical aperture (not shown) for defining the spot size of a corresponding laser beam.

The scanning assembly 14 includes a scanning device which, in the illustrated embodiment, comprises a rotatable polygon mirror 36. The mirror 36 has a plurality of mirror facets 38, eight facets in the illustrated embodiment, for reflecting the laser beams originating from each of the laser diode/pre-scan optical assemblies 11, 13. The polygon mirror 36 is driven in rotation about a rotational scanning axis 40 at a substantially constant speed by a scanning motor 42, see FIG. 1, wherein the beams from the laser diode/pre-scan optical assemblies 11, 13 are reflected by different facets 38 on the same diametric half of the polygon mirror 36 to produce two scanning beams 53a and 53b, see FIG. 1.

It should be noted that within the scope of the present invention, the scanning assembly may incorporate other types of scanning devices. For example, a micro-mirror scanning device may be incorporated into the scanning assembly in place of the polygon mirror 36. A micro-mirror scanning device generally includes a movable plate containing a reflective surface supported for oscillating movement about a pivotal scanning axis, movement of which is induced through electromagnetic forces. Such a micro-mirror scanning device is disclosed in U.S. patent application Ser. No. 10/093,754, filed on Mar. 8, 2002, which application is assigned to the assignee of the present invention and is incorporated herein by reference.

Each of the first and second post-scan optical assemblies 16, 18 comprises, in order along a corresponding optical path, a first fold mirror 44a, 44b, a first f-theta lens 46a, 46b, a second fold mirror 48a, 48b, a third fold mirror 50a, 50b and a second f-theta lens 52a, 52b, see FIG. 1. The two scanning beams 53a, 53b reflected from the polygon mirror 36 impinge upon the first fold mirrors 44a, 44b and are reflected downwardly by those fold mirrors 44a, 44b. The downwardly reflected beams 53a, 53b pass through a corresponding first f-theta lens 46a, 46b. Thereafter, each beam is reflected in a substantially horizontal direction by a second fold mirror 48a, 48b to a third fold mirror 50a, 50b. The beams reflected from the third fold mirrors 50a, 50b then pass through a corresponding second f-theta lens 52a, 52b. The scanning beams exiting the second f-theta lenses 52a, 52b generate a corresponding scan line 54a, 54b on a respective one of two photoconductive drums 20, 22, see FIG. 1. The first and second f-theta lenses 46a, 46b, 52a, 52b function in combination to linearize, focus, locate and generate the spot size of the beams forming the scan lines 54a, 54b.

Figure 3:
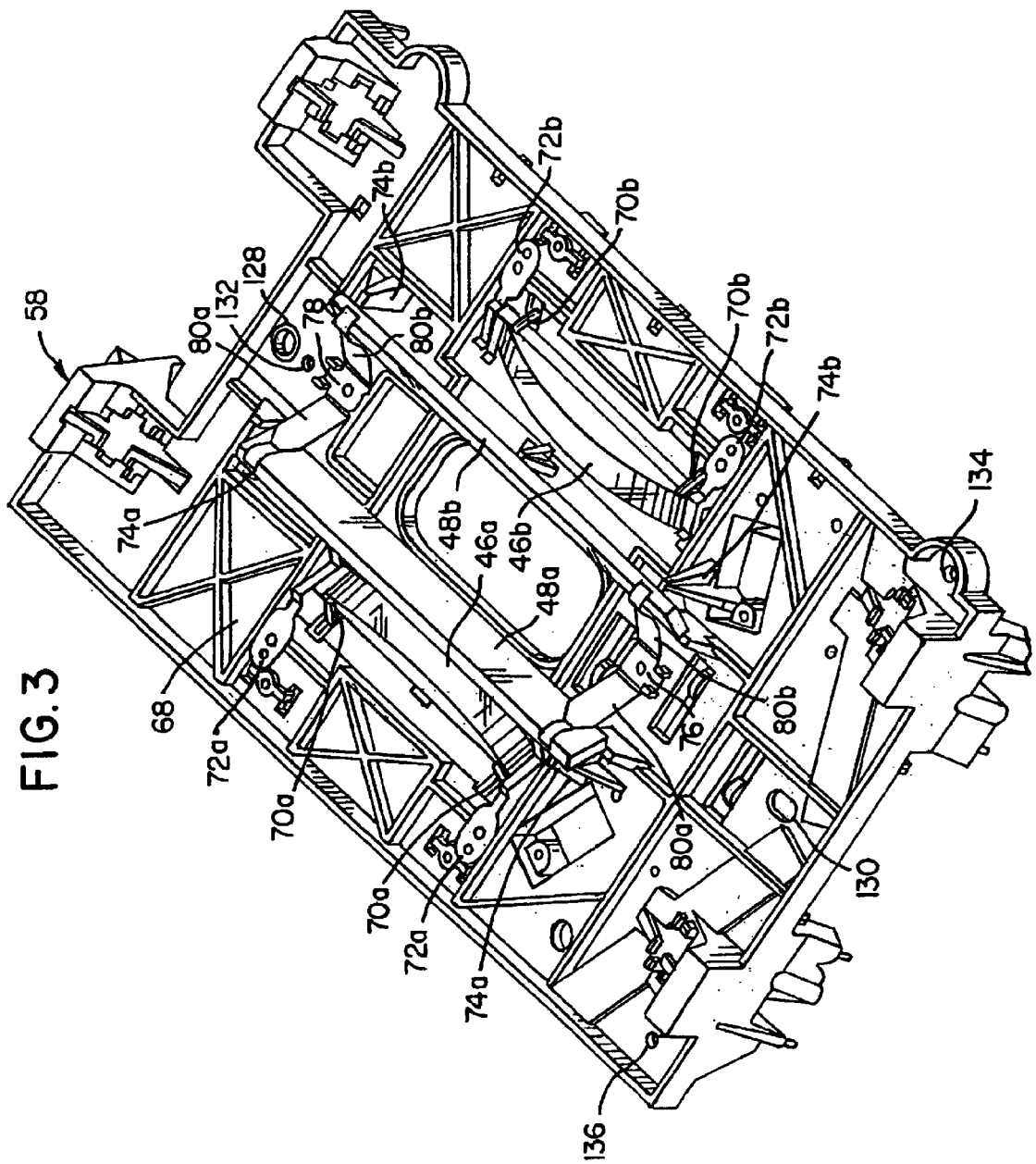
FIG. 3 is a view of a second or lower side of an upper housing portion of the laser scanning unit of FIG. 2.
Figure 4:
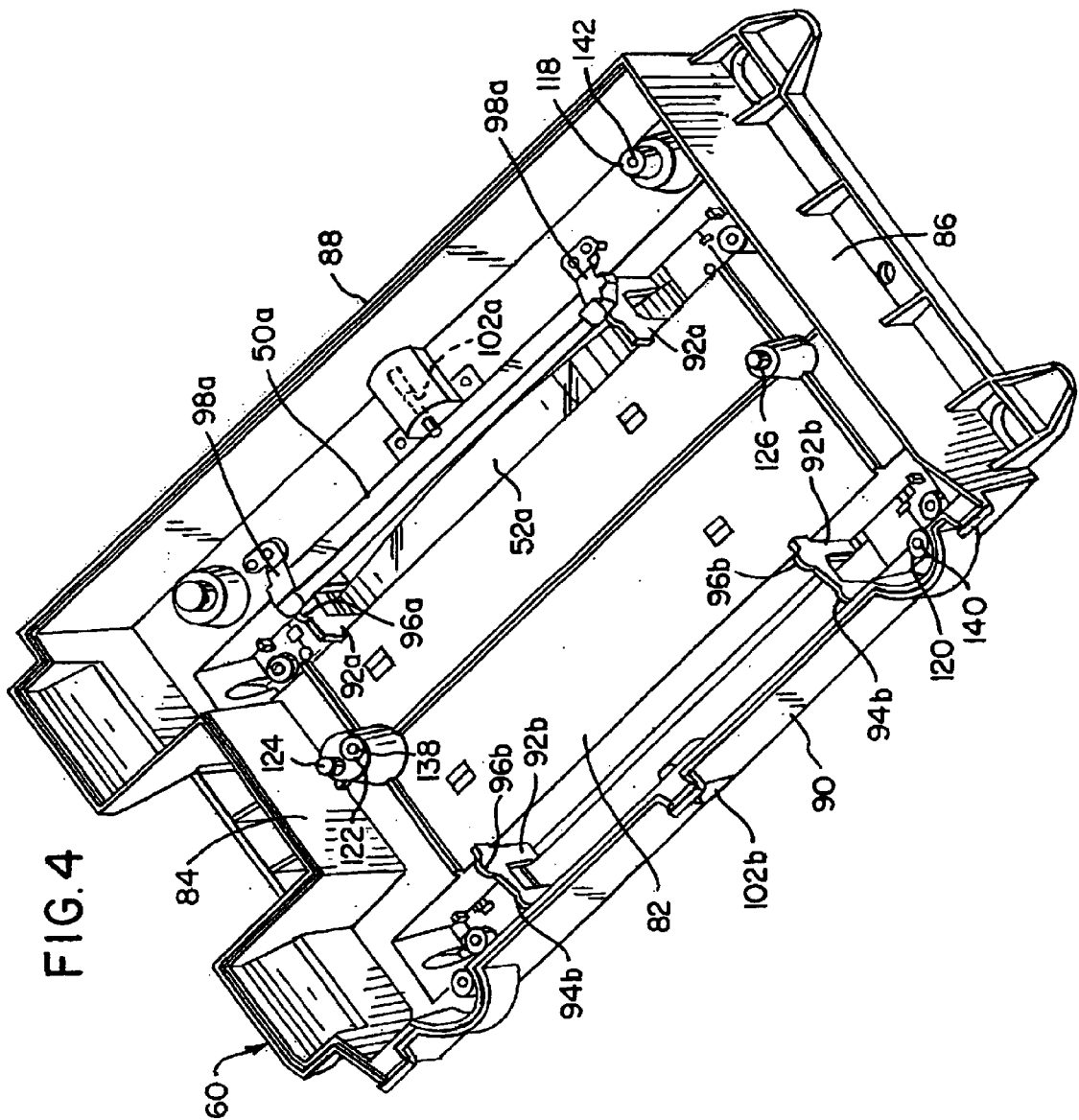
FIG. 4 is perspective view of an upper surface or side of a lower housing portion of the laser scanning unit of FIG. 2.

Referring to FIGS. 2–4, the optical system 5 is mounted to a housing 56 which comprises a two-part assembly including an upper housing portion 58 and a main or lower housing portion 60, wherein at least some of the optical components of the optical system 5 are mounted to each of the upper and lower housing portions 58, 60. In particular, the first and second laser diode/pre-scan optical assemblies 11 and 13, the scanning assembly 14, the first fold mirrors 44a, 44b, the first f-theta lenses 46a, 46b and the second fold mirrors 48a, 48b are mounted to the upper housing portion 58, and the third fold mirrors 50a, 50b and the second f-theta lenses 52a, 52b are mounted to the lower housing portion 60.

As best seen in FIG. 2, the first fold mirrors 44a, 44b are held in stationary position on a first or upper side 62 of the upper housing portion 58 by mirror supports 64a, 64b molded into the upper housing portion 58. In addition, a pair of spring clips 66a, 66b hold the mirrors 44a, 44b in position on the supports 64a, 64b.

Referring to FIG. 3, a second or lower side 68 of the upper housing portion 58 is shown wherein the first f-theta lenses 46a, 46b are held in stationary position by a support structure 70a, 70b and spring clips 72a, 72b. The second fold mirrors 48a, 48b are also mounted to the second side 68 of the upper housing portion 58 and are held in position by support members 74a, 74b, and a pair of spring clips 76, 78, each of the spring clips 76, 78 having a pair of opposing resilient elements 80a, 80b for engaging respective ends of each of the second fold mirrors 48a, 48b.

Referring to FIG. 4, the lower housing portion 60 includes a generally planer plate portion 82, vertical end portions 84, 86 extending generally perpendicular to the plate portion 82, and generally parallel side portions 88, 90 extending perpendicular to the plate portion 82.

Figure 5:
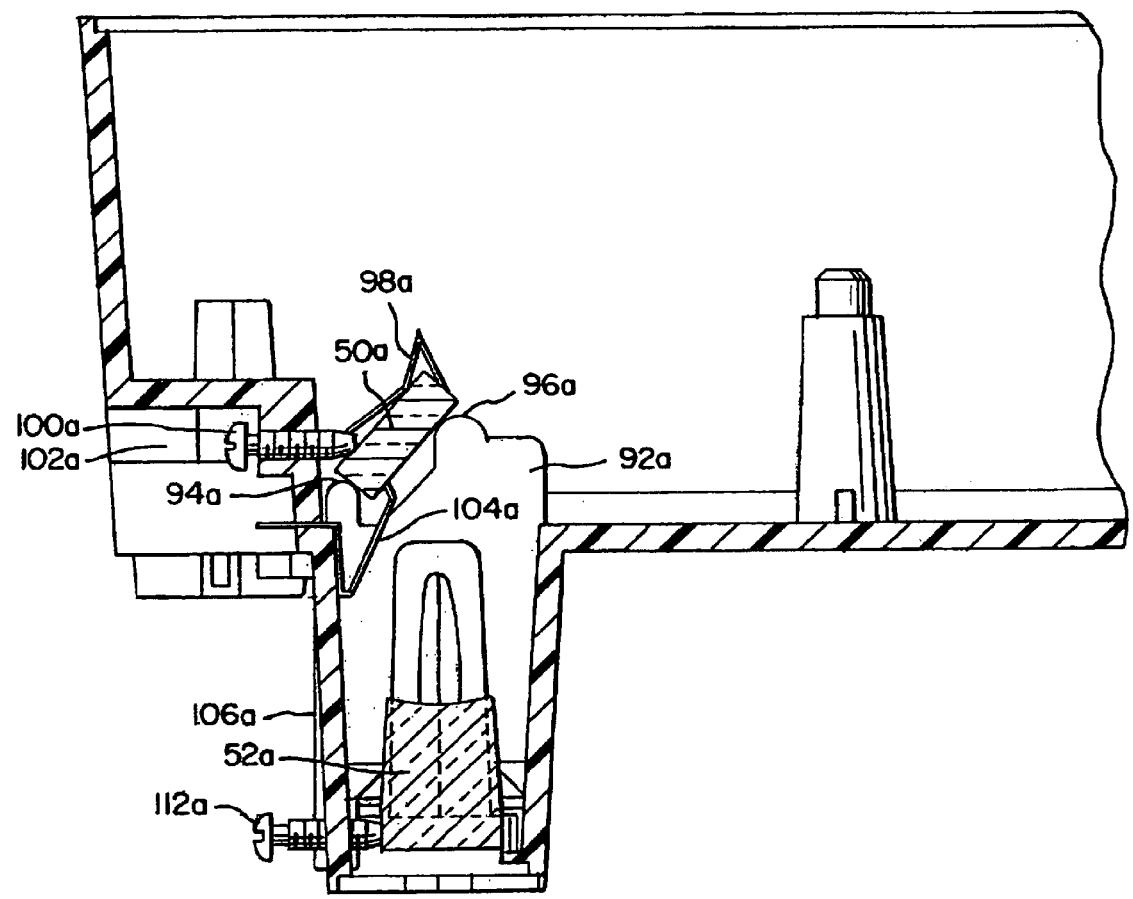
FIG. 5 is a view, partially in cross section, illustrating an adjusting screw for a third fold mirror and an adjusting screw for a second f-theta lens.

The third mirror 50a is supported on a pair of mirror mounts 92a wherein the corresponding third mirror 50b for the second scanning beam path is not shown in order to better illustrate the mirror mounts 92b. Referring also to FIG. 5, the mirror mounts 92a, 92b each include a respective lower mirror support 94a, 94b and mirror pivot mount 96a, 96b for providing contact points for the mirrors 50a, 50b. A pair of spring clips 98a (only one pair shown) are provided adjacent the ends of each mirror 50a, 50b for holding the mirrors 50a, 50b in engagement with the mirror mounts 92a, 92b.

Each mirror 50a, 50b is provided with an adjusting screw 100a (only one shown, see FIG. 5) located within a recessed portion 102a, 102b (see also FIG. 2) of the sides 88, 90 of the lower housing portion 60 and engaging a respective mirror 50a, 50b at a longitudinal midportion thereof. Each of the mirrors 50a, 50b further includes a lower biasing spring 104a (only one shown) biasing a respective mirror 50a, 50b at a longitudinal portion thereof toward its respective adjusting screw 100a. Each of the mirrors 50a, 50b is adjustable by its respective adjusting screw 100a (only one shown) wherein movement of the screw 100a into or out of the lower housing portion 60 causes pivotal movement of the mirror 50a, 50b about its respective pivot mounts 96a, 96b whereby angular adjustment of the mirror 50a, 50b is provided.

Referring to FIGS. 5 and 6, an adjustable mounting for each f-theta lens 52a, 52b will be described with particular reference to the f-theta lens 52a. The lower housing portion 60 is provided with first and second lens housings 106a, 106b for receiving the f-theta lenses 52a, 52b (only one shown in FIG. 6). As may be seen with reference to the lens housing 106b, a plurality of support surfaces 108b are provided for supporting the lens 50b, wherein substantially similar support surfaces are provided on the lens housing 106a for supporting the lens 52a. In addition, as illustrated with reference to lens housing 106a, a pair of resilient mounting clips 110a are provided at either end of the lens 52a for biasing the lens 52a toward its support surfaces, wherein it should be understood that a similar pair of clips are provided for biasing the lens 52b onto its corresponding support surfaces 108b.

Pairs of adjusting screws 112a, 112b, see also FIG. 2, (also referred to herein as an "adjustment mechanism") are provided extending into the respective lens housings 106a, 106b for engagement with longitudinally spaced side portions of the lenses 52a, 52b whereby the lenses 52a, 52b may be adjusted in a process direction extending perpendicular to the parallel sides 88, 90 of the lower housing portion 60. In addition, each lens 52a, 52b is biased by a pair of spring clips 114a (only one pair shown) for movement toward its respective adjusting screws 112a, 112b.

Referring to FIGS. 2–4, the upper housing portion 58 fits into the lower housing portion 60, and in particular, the lower housing portion 60 includes supporting reference surfaces 118, 120, 122 for engaging the second side 68 of the upper housing portion 58 to thereby support the upper housing portion 58 at a predetermined vertical location within the lower housing portion 60. In addition, the lower housing portion 60 defines alignment pins 124, 126 wherein the alignment pin 124 engages a hole 128 (FIG. 3) in the upper housing portion 58, and the alignment pin 126 engages a slot 130 in the upper housing portion 58. Thus, the engagement of the pins 124, 126 with the hole 128 and slot 130 operate to align the upper housing portion 58 in a particular predetermined horizontal position relative to the lower housing portion 60. The upper housing portion 58 is held in position on the lower housing portion 60 by screws (not shown) passing through holes 132, 134, 136 in the upper housing portion 58 and threadably engaging within holes 138, 140, 142 in the lower housing portion 60.

It should be understood that with the upper and lower housing portions 58, 60 assembled, the optical components of the first and second post-scan optical assemblies 16, 18 defining the corresponding optical paths are located in a compact, folded configuration. In particular, with the two housing portions 58, 60 assembled, the second fold mirrors 48a, 48b are located in a position generally adjacent to the plate 82 of the lower housing portion 60, aligned with the third fold mirrors 50a, 50b, and the first fold mirrors 44a, 44b direct the scanning beams for the two optical paths of the first and second post-scan optical assemblies 16, 18 inwardly toward each other to reflect off of the second fold mirrors 48a, 48b generally located beneath the scanning assembly 14. Accordingly, the space beneath and on either side of the scanning assembly 14 is efficiently used which, in combination with using a common scanning assembly 14 for generating scanning beams for both post-scan assemblies 16,18, facilitates minimization of the space requirements for the present laser scanning unit.

Further, it should be noted that the present laser scanning unit 7 is intended for use in a color laser printer using two of the disclosed laser scanning units 7 for generating latent images which, once developed on corresponding PC drums, may form black, magenta, cyan and yellow toner images, such that each of the laser scanning units 7 in a printer is provided to generate two different latent images. In order to provide for accurate registration between toner images, accurate alignment is required between the two scan lines 54a and 54b produced by each laser scanning unit 7, including alignment of the distance between the two scan lines in the process direction, perpendicular to the direction of the scan lines 54a and 54b, and also including adjustment of the amount of bow or bow error of each of the two scan lines 54a and 54b, such that variance or any difference between the bow of the two scan lines 54a and 54b is minimized. "Bow error" typically is arc-shaped and is generally measured in the process direction from a desired straight line extending in the scan direction between the start and end points of the scan line to the maximum offset on the arc-shaped scan line.

The location of each scan line 54a and 54b in the process direction is adjusted so as to be within a predetermined tolerance, e.g., plus or minus 0.25 mm, of a desired position for that scan line. The desired process position for each scan line 54a, 54b may be relative to the same datum point (not shown) or separate datum points (not shown) provided on the housing 56. It is also contemplated that one scan line, either scan line 54a or scan line 54b, may be adjusted relative to its corresponding datum point and, thereafter, the desired process position for the remaining scan line may be adjusted so as to take into account any offset in the process position of the one scan line from its desired process position, e.g., the one scan line may be offset 0.24 mm from its desired process position yet still be within the allowable tolerance. Hence, by making separate adjustments for each scan line 54a and 54b, the variation in distance d in the process direction between the scan lines 54a, 54b, see FIG. 1, may be held to within a preselected tolerance, e.g., plus or minus 0.25 mm, in order to maintain acceptable image registration between the different color toner images. For example, in a preferred embodiment, the distance d between the scan lines 54a, 54b is 101 mm plus or minus 0.25 mm.

The configuration of the present laser scanning unit 7 facilitates formation of the scan lines 54a, 54b such that the bow error (curved distortion away from a desired straight scan line) and linearity error (PEL spacing variation along a scan line from a desired constant spacing between PELs) of each scan line 54a, 54b has a similar shape and magnitude in order to ensure that no point along the toner image of one color is misregistered relative to another color image by more than a predetermined amount. One aspect for achieving proper registration, such that the linearity error for the first scan line 54a is substantially the same in shape and magnitude to that of the second scan line 54b, is to ensure that the beams produced by the first and second laser diode/pre-scan optical assemblies 11, 13 are directed at angles $\alpha_1$ and $\alpha_2$ relative to lines $L_1$ and $L_2$ extending substantially parallel to the scan lines 54a, 54b, and wherein the angles $\alpha_1$ and $\alpha_2$ have substantially the same magnitude but extend in opposite directions, i.e., are mirror images of one another. Hence, the angles $\alpha_1$ and $\alpha_2$ are symmetrical about a plane $P_L$ passing through the center of the scanner 14 and substantially parallel to the scan lines 54a, 54b, see FIG. 2. In addition, bow error for each scan line 54a and 54b is adjusted to within a desired tolerance of a nominal bow value, e.g., plus or minus 20 microns from a nominal value which may range from 0 to several hundred microns of bow. It is noted that the actual value of bow is not important (as long as it does not exceed several hundred microns). However, the variance in the bow values of the first and second scan lines 54a and 54b must be small, such as ±20 microns.

Adjustment of bow and process position for each of the first and second scan lines 54a and 54b is effected using an alignment process including an alignment of the third fold mirrors 50a, 50b and the second f-theta lenses 52a, 52b, which will now be described.

In adjusting the bow value for and setting the proper alignment of each scan line 54a, 54b, the second f-theta lenses 52a, 52b are initially placed at a reference location within the lens housings 106a, 106b. As may be seen in FIG. 6 with reference to lens housing 106b, alignment tabs 146b are molded into the lens housing 106b and define an alignment edge 148b. During initial set up of the scanning unit, the second f-theta lens 52b is aligned, using adjustment screws 112b, such that a longitudinal edge of the lens 52b is in alignment with the alignment edge 148b of each alignment tab 146b. The lens housing 106a includes similar alignment tabs defining alignment edges for use in aligning the second f-theta lens 52a to an initial position.

For purposes of illustration, the bow value and process position of the first scan line 54a is adjusted before that of the second scan line 54b. However, the process can be performed in a reverse order or simultaneously.

Referring to FIG. 7, a calibration arrangement for use in adjusting bow and process position of the scan line 54a is schematically illustrated, it being understood that a similar arrangement is also provided for the scan line 54b. The calibration arrangement includes first and second end camera units 150a, 152a, each comprising a single camera, and a central camera unit 154a comprising first and second cameras 192a, 192b and a beam splitter 184a. The beam splitter 184a splits the incoming beam into first and second beam portions 188a, 186a which are received by the first and second cameras 192a, 192b, respectively. It is noted that the central camera unit 154a may only comprise a single camera. In point of fact, only one of the first and second cameras 192a, 192b is used during bow and process position adjustment.

The camera units 150a, 152a, 154a are positioned at locations which correspond to the latent image-receiving plane defined by the outer surface of the photoconductive drum 20, wherein the end camera units 150a, 152a are located at positions corresponding to the ends of the scan line 54a, and the central camera unit 154a is located such that the scanning line intersects the beam splitter 184a. The camera units 150a, 152a, 154a are connected to a processor $P_R$ for processing signals from the camera units 150a, 152a, 154a corresponding to the particular location on each camera unit traversed by the scanning beam. It should be understood that information from the end camera units 150a, 152a is used to determine the process position and the skew orientation of the scan line 54a, and information from the end camera units 150a, 152a in combination with information from the central camera unit 154a is used to determine the bow of the scan line 54a. In addition, it should be noted that the calibration arrangement illustrated in FIG. 7, as well as the corresponding calibration arrangement (not shown) for aligning the scan line 54b, is preferably mounted in an alignment fixture (not shown) to which the scan unit 7 may be mounted.

It is noted that pivotable movement of the third fold mirror 50a effects a change in the bow value for the scan line 54a as well as a change in the position of the scan line 54a in the process direction. Furthermore, linear movement of the second f-theta lens 52a in the process direction also effects a change in the scan line bow value and scan line position in the process direction. In order to minimize the number of third fold mirror 50a and second f-theta lens 52a adjustment steps required to adjust bow and process position of the scan line 54a during manufacturing, the present invention provides for making only two adjustments after the third fold mirror 50a has been rotated such that the scanning beam has been sensed by the camera units 150a, 152a and 154a as well as by a corresponding horizontal sync (Hsync) sensor (not shown) integral to the laser scanning unit 7: an adjustment to the third fold mirror 50a and a final adjustment to the second f-theta lens 52a. The Hsync sensor senses the beam just prior to the beam writing or imaging a line of print elements (PELs) or dots on the PC drum 20. More specifically, the invention provides for adjusting the third fold mirror 50a such that the bow value for the scan line 54a is equal to a bow adjustment target value $B_T$, which typically is not equal to a final, desired nominal bow value. The bow adjustment target value $B_T$ is determined such that adjustment of the second f-theta lens 52a to position the scan line 54a in the process direction within a predetermined tolerance of a desired process position also results in the bow value for the scan line 54a falling within a desired tolerance of a nominal bow value, e.g., 0 microns of bow ±20 microns. Alternatively, if the second f-theta lens 52a is adjusted such that the scan line bow value falls within a desired tolerance of a nominal bow value, e.g., 0 mm of bow ±20 microns, the scan line 54a is also located in the process direction within a predetermined tolerance of a desired process position.

It is also contemplated that the third fold mirror 50a may be rotated to a nominal position and, thereafter, the second f-theta lens 52a may be moved, i.e., translated, such that the bow value for the first scan line 52a is equal to a first predetermined target value. Then, the third fold mirror 50a may be rotated again such that the bow value for the scan line 52a falls within a desired tolerance of a nominal bow value, e.g., 0 mm of bow ±20 microns, or the scan line 52a is located in the process direction within a predetermined tolerance of a desired process position. When the third fold mirror 50a is rotated such that the scan line 52a falls within a desired tolerance of a nominal bow value, the position of the scan line 52a should also be located within a predetermined tolerance of a desired process position. Likewise, when the third fold mirror 50a is rotated such that the scan line 52a is located within a predetermined tolerance of a desired process position, the bow value of the scan line 52a should fall within a desired tolerance of a nominal bow value.

With the second f-theta lens 52a positioned at the initial reference location, the third fold mirror 50a is first pivoted to a first location by means of the adjusting screw 102a, see FIG. 4, such that the scanning beam 53a is sensed by the Hsync sensor and the camera units 150a, 152a and 154a. With the third fold mirror 50a in its first location, the processor $P_R$ coupled to the camera units 150a, 152a and 154a determines an initial process position $PE_1$ and an initial bow value $BE_1$ for the scan line 54a. The initial process position $PE_1$ may be determined using camera unit 150a and camera unit 152a. The position where the beam 53a strikes each camera unit 150a, 152a is sensed by each camera unit 150a, 152a and provided to the processor $P_R$, which determines the current scan line position relative to a datum point on the housing 56. The processor $P_R$ further determines an initial bow value $BE_1$ by taking information from the camera units 150a, 152a and 154a regarding where the beam 53a crosses the camera units.

Using the following equation and the initial process position $PE_1$ and the initial bow value $BE_1$, the processor $P_R$ determines the bow adjustment target value $B_T$:

$$B_T=(R_1{}^*S1)((PE_1-P_2)+((R_2/R_1)^*B_2)-((S_2/S_1)^*BE_1))/((S_1/R_2)-(S_2{}^*R_1))$$

where:
$PE_1$=the initial process position;
$BE_1$=and the initial bow value;
$P_2$=the desired nominal process position;
$B_2$=the desired nominal bow value, e.g., 0 mm, which is determined by taking an average of the bow of each of a predetermined number of actual scanning units 7, e.g., 50 units, after those units have been calibrated or adjusted to an acceptable bow value;
$R_1$=−0.0707 mm/mm of translation—A first linearized sensitivity of bow to translation of the second f-theta lens 52a;
$S_1$=−0.304 mm/degree of rotation—A first linearized sensitivity of bow to rotation of the third mirror 50a;
$R_2$=1.501 mm/mm of translation—A second linearized sensitivity of process position to translation of the second f-theta lens 52a; and
$S_2$=2.933 mm/degree of rotation—A second linearized sensitivity of process position to rotation of the third mirror 50a.

The third fold mirror 50a is then further rotated until the measured bow value, as determined by the processor $P_R$ from inputs from the camera units 150a, 152a and 154a, is equal to the bow adjustment target value $B_T$ or to within a predetermined tolerance of the target value $B_T$. This is the first of the two adjustments noted above.

Thereafter, the second f-theta lens 52a is translated in the process direction via screws 112a so as to set the final process position for the scan line 54a to within a predetermined tolerance of a desired process position relative to a datum point on the housing 56. This is the second of the two adjustments noted above. As further noted above, adjustment of the second f-theta lens 52a such that the scan line 54a is positioned in a desired location in the process direction also results in the bow value for the scan line 54a falling within a desired tolerance of a nominal bow value, e.g., 0 microns of bow ±20 microns.

The adjusting screws 112a may also be used to adjust skew, as needed, by moving one of the adjusting screws 112a more than the other adjusting screw 112a in order to pivot the second f-theta lens 52a relative to the process direction. It is believed that adjustment of the second f-theta lens 52a to correct skew will have a small effect on bow and process position of the scan line 54a. However, if the effect is found to be unacceptable, then bow and process position of the scan line 54a can be adjusted one or more additional times after skew is corrected.

It should be understood that the third fold mirror 50b and second f-theta lens 52b of the second post-scan assembly 18 may be adjusted in a manner similar to that described for the third fold mirror 50a and second f-theta lens 52a of the first post-scan assembly 16 as required to obtain a desired process position for the scan line 54a relative to a datum point on the housing 56, and a bow value falling with a desired tolerance of a nominal bow value, e.g., 0 microns of bow ±20 microns. It is also noted that when adjusting the process position of the second scan line 54b, the desired process position may be varied so as to take into account any offset of the final position of the first scan line 54a in the process direction from a desired final process position.

The two-step adjustment process for adjusting scan line bow and process position and the equation for bow adjustment target value $B_T$ are applicable for use in adjusting the third fold mirrors 50a, 50b and second f-theta lenses 52a, 52b of the first and second post-scan assemblies 16, 18 illustrated in FIGS. 1 and 7A. Locations of specific points 1–8 along the optical path defined by the components of each post-scan assembly 16, 18 relative to a reflection point RP on the polygon mirror 36, as illustrated in FIG. 7A, are as follows:

Point 1=−29.00 mm (X-direction); 0 mm (Z-direction);
Point 2=−20.96 mm (X-direction); −10.5 mm (Z-direction);
Point 3=−15.18 mm (X-direction); −18.04 mm (Z-direction);
Point 4=−3.81 mm (X-direction); −32.89 mm (Z-direction);
Point 5=−30.39 mm (X-direction); −32.89 mm (Z-direction);
Point 6=−29.08 mm (X-direction); −62.86 mm (Z-direction);
Point 7=−28.71 mm (X-direction); −71.35 mm (Z-direction);
Point 8=−23.85 mm (X-direction); −182.74 mm (Z-direction).

It is also noted that each first f-theta lens 46a, 46b has a first surface 140a, 140b, see FIGS. 1, 7A–7C, having a radius $R_{P1A}$, $R_{P1B}$ in the process direction of 1034.05 mm and a radius $R_{S1A}$, $R_{S1B}$ in the scan direction of 1034.05 mm. Each first f-theta lens 46a, 46b further includes a second surface 142a, 142b having a radius $R_{P2A}$, $R_{P2B}$ in the process direction of 40.00 mm and a radius $R_{S2A}$, $R_{S2B}$ in the scan direction defined by the following equation:

$$X = -(4.923 \times 10^{-3} y^2) - (7.126 \times 10^{-8} y^4) + (2.488 \times 10^{-11} y^6) - (2.632 \times 10^{-14} y^8) + (4.599 \times 10^{-18} y^{10})$$

where y extends in the scan direction and X is the sag value and extends along the system optical axis, see FIGS. 7A–7C.

Each second f-theta lens 52a, 52b has a first surface 150a, 150b having a radius $R_{P1A}$, $R_{P1B}$ in the process direction defined by the following equation:

$$R = 36.042 - (8.889 \times 10^{-4} y^2) + (2.370 \times 10^{-7} y^4) + (8.235 \times 10^{-12} y^6) - (3.358 \times 10^{-15} y^8) + (1.050 \times 10^{-19} y^{10}) + (1.032 \times 10^{-23} y^{12})$$

where y extends in the scan direction and R is the radius value $R_{P1A}$, $R_{P1B}$ and a radius $R_{S1A}$, $R_{S1B}$ in the scan direction of 235.00 mm. Each second f-theta lens 52a, 52b further includes a second surface 152a, 152b having a radius $R_{P2A}$, $R_{P2B}$ in the process direction of 18.75 mm and a radius $R_{S2A}$, $R_{S2B}$ in the scan direction of 386.82 mm.

The equation for bow adjustment target value $B_T$ was derived as follows. Initially, the following sensitivity equations were provided:

$$(R_1) * (Z) + (S_1) * (\Theta) = B \quad \text{(Equation 1)}$$

$$(R_2) * (Z) + (S_2) * (\Theta) = P \quad \text{(Equation 2)}$$

where

Z=amount of translation of the second f-theta lens (mm);
Θ=amount of rotation of the third fold mirror (degrees);
$R_1$=A first linearized sensitivity of bow to translation of the second f-theta lens, determined either experimentally or using a conventional optical system model, both of which are commonly known to those skilled in the art;
$S_1$=A first linearized sensitivity of bow to rotation of the third mirror, determined either experimentally or using a conventional optical system model, both of which are commonly known to those skilled in the art;
$R_2$=A second linearized sensitivity of process position to translation of the second f-theta lens, determined either experimentally or using a conventional optical system model, both of which are commonly known to those skilled in the art;
$S_2$=A second linearized sensitivity of process position to rotation of the third mirror, determined either experimentally or using a conventional optical system model, both of which are commonly known to those skilled in the art;
B=change in bow value; and
P=change in process position of a scan line.

It was assumed that only the third fold mirror is first adjusted to change its position $\Theta_1$ (degrees) to yield a bow change $B_1$ equal to the amount of bow change needed to achieve a desired, intermediate bow target value, $B_T$. Thus, Z=0 is input into Equation 1 above to yield:

$$(S_1) * (\Theta_1) = B_1 \quad \text{(Equation 3)}$$

The amount of bow change $B_1$ needed in this first step is a linear combination of the change needed to eliminate the initial bow value $BE_1$ and the amount of bow change needed to achieve a bow adjustment target value $B_T$.

$$B_1 = (-BE_1) + B_T \quad \text{(Equation 4)}$$

With Z=0 and the third fold mirror rotated $\Theta_1$ to achieve the desired bow adjustment target value $B_T$, a new process position $P_1$ comprises an initial process position $PE_1$ plus the change in process position resulting from rotation of the third fold mirror, as determined from Equation 2 with Z=0:

$$P_1 = PE_1 + (S_2) * (\Theta_1) \quad \text{(Equation 5)}$$

It is desired to leave the third fold mirror in the position resulting from rotation amount $\Theta_1$ and translate the second f-theta lens by an amount $Z_1$ such that the process position $P_1$ is changed to the desired final position, $P_2$, and the bow value becomes $B_2$. Hence, the change in rotation of the third mirror is Θ=0 and Equation 2 yields:

$$(R_2) * (Z_1) = -P_1 + P_2 \quad \text{(Equation 6)}$$

and the resulting process location becomes $P_2$.

The new bow value, $B_2$, is a linear combination of the bow value from the third fold mirror rotation, $B_T$, and the bow change caused by the second f-theta lens translation, $Z_1$:

$$B_2 = B_T + (R_1) * (Z_1) \quad \text{(Equation 7)}$$

A unique solution exists for Equations 3–7, which can be determined numerically using conventional matrix solver software such as Excel or Mathcad (or can be solved in closed form to yield the equation set out above for the bow adjustment target value $B_T$). In matrix form, the five unknowns are: $\Theta_1$; $Z_1$; $B_T$; $B_1$; and $P_1$. The input variables are $BE_1$ (measured); $PE_1$ (measured); $P_2$ (the desired final process location value) and $B_2$ (the desired nominal bow value, e.g., 0 mm, which is determined by taking an average of the bow of each of a predetermined number of actual scanning units 7, e.g., 50 units, after those units have been calibrated or adjusted to an acceptable bow value).

Proper alignment of the scan lines 54a, 54b further requires proper alignment of the laser diode/pre-scan optical assemblies 11, 13 in order to provide proper location of the beams reflected from the scanning assembly 14 to the post-scan assemblies 16, 18, as provided by adjustment of the collimation assemblies 27a, 27b, and to provide a desired spot size for forming the scan lines 54a, 54b at the photoconductive drums 20, 22, as provided by adjustment of the pre-scan lens carriers 34a, 34b.

Referring to FIG. 8, the collimation assemblies 27a, 27b are each aligned to a desired direction using a quad cell sensor 160 supported in a mount structure 162 which comprises an alignment mount 164 extending through an opening 166 in the upper housing portion 58. At this juncture, the lower housing portion 60 is not coupled to the upper housing portion 58. The quad cell sensor 160 is positioned at a point of intersection between the two beams produced by the first and second laser diode/pre-scan optical assemblies 11, 13, and the alignment of the collimation assemblies 27a, 27b is performed prior to installation of the scanning assembly 14. The quad cell sensor 160 detects the position of each beam in scan and process directions. Each collimation assembly 27a, 27b is correctly aligned when its corresponding beam impinges upon a predetermined position of the quad cell sensor 160, e.g., a center portion thereof. Hence, alignment of the collimation assemblies 27a, 27b occurs prior to adjustment of bow and process position for the scan lines 54a, 54b.

Figure 9:
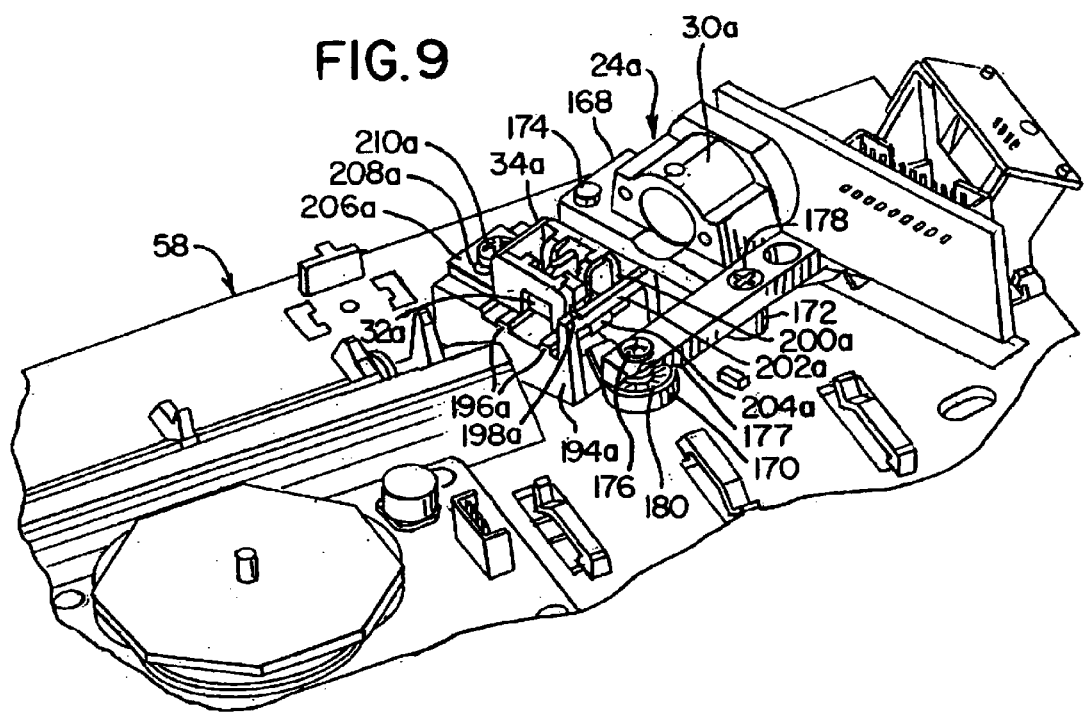
FIG. 9 is an enlarged perspective view of a collimation assembly of the laser scanning unit of FIG. 2.

The alignment of the collimation assemblies 27a, 27b will be described with particular reference to the first collimation assembly 27a, an enlarged view of which is shown in FIG. 9. The collimation assembly 27a includes an L-shaped base member 168 supported on a fixture structure comprising at least support members 170, 172, and including a pivot pin 174 wherein the fixture structure may be formed as an integral part of the upper housing portion 58 or may be formed as a separate structure fit to the upper housing portion 58, such as including members extending upwardly through the upper housing portion 58 to engage and/or support the base member 168. The collimation housing 30a is supported on the base member 168, and together define a collimation structure. The base member 168 is movable relative to the fixture structure 170, 172, 174 to position the beam output from the collimation assembly 27a in first and second directions which are substantially perpendicular to one another. In particular, the fixture structure pin 174 engages an aperture in the base member 168 to permit pivotal movement of the base member 168 in a horizontal plane about an axis defined by the pin 174. Further, fasteners 176, 178 extend through the base member 168 into threaded engagement with the fixture elements 170, 172 wherein apertures in the base member 168 accommodating the fasteners 176, 178 are oversized in order to permit pivotal movement of the base member 168 about the pin 174.

In addition, a compressible spring structure is provided between the base member 168 and the fixture structure element 170, and in the preferred embodiment, the compressible structure comprises a belleville washer 180. Compressive force applied by the fastener 176 to move a leg 177 of the base member 168 downwardly toward the fixture element 170 causes pivotal movement of the base member 168 in a vertical direction whereby the vertical position of the laser beam originating from the collimation assembly 24a is adjusted in a vertical direction, i.e., in the process direction. The belleville washer 180 defines a compressible spring biased spacer maintaining the base member 168 in contact with a head portion of the fastener 176 while permitting vertical movement of the leg 177 relative to the fixture element 170. It is also contemplated that an element, other than a belleville washer, such as a conventional jack screw (not shown), may be provided to adjust or reposition the base member 168 relative to the upper housing portion 58. Accordingly, adjustment of the base member 168 provides both horizontal and vertical adjustment of the laser beam output from the collimation assembly 27a and sensed by the quad cell sensor 160. Further, the collimation assembly 27b is supported in substantially the same manner as the collimation assembly 27a for adjustment of the beam output from the collimation assembly 27b in a horizontal and vertical direction to be sensed by the quad cell sensor 160. It is noted that movement of the collimation assemblies 27a and 27b also results in movement of the corresponding laser driver cards 28a, 28b.

As noted above, the positions of the pre-scan lens carriers 34a, 34b are adjusted to provide the desired spot size at the photoconductive drums 20, 22, and in particular, it is desirable to adjust the positions of the pre-scan lens carriers 34a, 34b such that the waist of each respective beam occurs at or near the point of incidence on the corresponding PC drum 20, 22. In order to determine the location of the beam waist, a beam waist calibration arrangement is provided for measuring the spot size at two spaced locations from which the waist location may be extrapolated in the following manner. The adjustment of the pre-scan lens carriers 34a, 34b may be effected prior to or after adjustment of bow and process position for the scan lines 54a, 54b. Preferably, the adjustment of the carriers 34a, 34b occurs after the scanning unit 7 has been fully assembly and adjustment of bow and process position for the scan lines 54a, 54b has taken place.

Initially, an average focus point f of a parabola plotted for laser beam spot size is determined for a given pre-scan lens, which lens is used as pre-scan lenses 32a, 32b in the scanning unit 7. This involves moving the position of the pre-scan lens in small increments, e.g., 500 microns, relative to a nominal position of the lens from a known location where a surface of a corresponding PC drum will be positioned below a pre-scan lens 32a, 32b once the scanning unit 7 is assembled in a printer. At each pre-scan lens position, spot size of the beam is measured using a conventional spot size sensor/camera at about 15 beam locations spaced from the known PC drum surface location, including locations above the drum surface and below the drum surface. From the 15 spot size values, a curve, which will have the shape of a parabola, is generated as well as a parabolic equation for that curve or spot size data. Hence, an equation in the form of $y=ax^2+bx+c$ is determined. The parabola focus point f is then determined from the equation $f=1/(4a)$, where "a" is taken from the determined parabolic equation. A plurality of "f" values are determined for a plurality of pre-scan lens positions and an average f value is calculated.

The following equations A and B are given:

$$y_{c1}=(1/(4f))(x_{c1}^2)+bx_{c1}+c \tag{A}$$

$$y_{c2}=(1/(4f))(x_{c2}^2)+bx_{c2}+c \tag{B}$$

The two equations are solved for b and c as follows:

$$b=(-\tfrac{1}{4})[(-4*y_{c1}*f+x_{c1}^2+4*y_{c2}*f-x_{c2}^2)/(f*(x_{c1}-x_{c2}))]$$

$$c=(\tfrac{1}{4})[(4*y_{c2}*f*x_{c1}-x_{c2}^2*x_{c1}-4*x_{c2}*y_{c1}*f+x_{c2}^2*x_{c1}^2)/(f*(x_{c1}-x_{c2}))]$$

where:

$x_{c1}$=optical distance of a first spot size sensor/camera 192a, see FIG. 10, from a known location of a surface of a corresponding PC drum to be positioned below the scanning unit 7 in a printer;

$x_{c2}$=optical distance of a second spot size sensor/camera 192b from a known location of a surface of a corresponding PC drum to be positioned below the scanning unit 7 in a printer;

$y_{c1}$=spot size as sensed by the first spot size sensor 192a; and $y_{c2}$=spot size as sensed by the second spot size sensor 192b.

For a given position of a pre-scan lens 32a, 32b in the housing 56, a waist position of the laser beam passing through the lens relative to the known PC drum surface position, i.e., the distance the beam waist is away from the known PC drum surface position, can be determined by taking the derivative of the parabolic equation and solving for zero. This provides:

$$X=-b/(2a)$$

where X=the location of the beam waist relative to the known location of the surface of a corresponding PC drum to be positioned in a printer below the scanning unit 7;

$$a=1/(4f)$$

where f is the average parabola focus point calculated as noted above.

Hence, an operator can reposition a pre-scan lens 32a, 32b so that the waist of the corresponding laser beam is positioned at or near a known location of a surface of a PC drum to be positioned below the scanning unit 7. This involves taking data from two spot size sensors/cameras 192a, 192b, see FIG. 10, located a known optical distance from a known location of a surface of a PC drum to be positioned below the scanning unit 7 and solving for b and then X. A conventional microprocessor, such as processor $P_R$ illustrated in FIG. 7, could be used to solve for b and X. Once, X is at or near zero, the beam waist is at or near the know PC drum surface position. It is also contemplated that a look-up table or linear equation can be generated to provide an operator with information regarding a distance and direction the pre-scan lens 32a, 32b must be moved from the measured position so that the beam waist is at or near the known location of a surface of a PC drum to be positioned below the scanning unit 7. It is further contemplated that, after a pre-scan lens has been repositioned, new spot size values can be received from the sensors 192a, 192b and used to determine if the beam waist is at or near the known location of a surface of a PC drum to be positioned below the scanning unit. Visual indicators, such as green and red lamps, indicating respectively that the pre-scan lens is properly positioned or not, may be provided.

Figure 10:
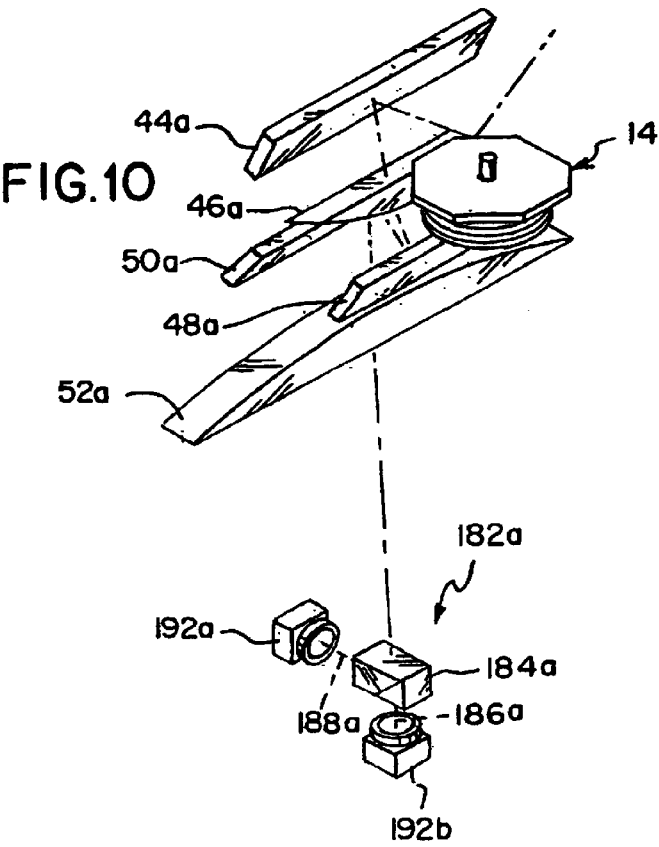
FIG. 10 is a perspective view of a post-scan optical assembly removed from a scanning unit housing and illustrating a camera unit of a calibration arrangement for use in adjusting the position of a pre-scan lens and its carrier.

Referring to FIG. 10, a pre-scan lens calibration arrangement 182a is schematically illustrated positioned below the first post-scan optical assembly 16. The calibration arrangement 182a may comprise the camera unit 154a illustrated in FIG. 7. The calibration arrangement 182a includes a beam splitter 184a positioned to receive the beam from the second f-theta lens 52a, which beam is split into first and second beam portions 186a, 188a. First and second cameras 192a, 192b are positioned to receive the first and second beam portions 188a, 186a, respectively, and measure the spot size for each of the first and second beam portions 186a, 188a. The first camera 192a is positioned a predetermined optical distance $X_{c1}$ above or in front of a known location of a surface of a corresponding PC drum to be positioned below the scanning unit 7. The second camera 192b is positioned a predetermined optical distance $X_{c2}$ below or beneath a known location of a surface of a corresponding PC drum to be positioned below the scanning unit 7. During testing, the scanning 7 unit is not mounted within a printer housing. Hence, a PC drum is not positioned below the unit 7 during calibration of the position of the pre-scan lens 32a. From the two measured spot sizes, $y_{c1}$ and $y_{c2}$, and the known optical distances $x_{c1}$ and $x_{c2}$ from the cameras 192a and 192b to a known PC drum surface location, it is possible to calculate the location X of the beam waist using the equations noted above wherein movement of the pre-scan lens carrier 34a longitudinally along a pre-scan lens support structure 194a operates to adjust the position of the beam waist to the desired location. It should be understood that a similar calibration assembly is provided for positioning of the pre-scan lens carrier 34b.

The pre-scan lens support 194a includes guide rail portions 196a supporting the pre-scan lens carrier 34a and underlying the pre-scan lens 32a. The pre-scan lens carrier 34a includes a pair of spaced engagement portions 198a, 200a for engaging a guide bar 202a of the support structure 194a to facilitate locating the pre-scan lens carrier 34a in a direction transverse to its longitudinal movement. A tab portion 204a of the pre-scan lens carrier 34a engages under the guide bar 202a to maintain one side of the pre-scan lens carrier 34a in engagement with the guide rail portions 196a, and an opposite side of the pre-scan lens carrier 34a includes a tab 206a defining a slot 208a through which is positioned a fastener 210a for vertically positioning the side of the pre-scan lens carrier 34a opposite from the guide bar 202a, and for locking the pre-scan lens carrier 34a at its adjusted location. A similar pre-scan lens calibration arrangement and similar support structure is provided for calibration of the second pre-scan lens carrier 34b whereby the second pre-scan lens carrier 34b is adjustable in the same manner as described for the first pre-scan lens carrier 34a.

It should be understood that by providing the above-described adjustments for the collimation assemblies 27a, 27b and for the pre-scan lenses 32a, 32b, it is possible to provide the housing 56 for the present laser scanning unit as a molded unit and in which the tolerance limits for the upper and lower housing portions 58, 60 may be relaxed, resulting in reduced molding costs for forming the housing 56. In particular, since the alignment of the beams formed at the laser diode/pre-scan optical assemblies 11, 13 is adjustable subsequent to assembly within the upper housing portion 58, it is possible to form the upper housing portion 58 with less strict tolerance limits, such as may be required if the alignment of the optical components relied entirely on the location of the mounting points provided in the housing.

Similarly, the adjustment of the third fold mirrors 50a, 50b and second f-theta lenses 52a, 52b provides for adjustment of the scan line characteristics whereby greater variations in tolerance and assembly location between the upper and lower housing portions 58, 60 may be readily accommodated. Further, the adjustability of the third fold mirrors 50a, 50b and second f-theta lenses 52a, 52b, and resulting ability to construct the present laser scanning unit as a two piece housing, enables the scanning unit to be formed in a compact configuration facilitating assembly by providing for mounting of optical components on both the upper housing portion 58 and lower housing portion 60 prior to assembly of the housing 56.

What is claimed is:

1. In a laser scanning unit comprising a housing, a scanning assembly including a scanning device, a laser diode for generating a laser beam, a collimation assembly for substantially collimating said laser beam and a pre-scan structure comprising a pre-scan lens carrier including a pre-scan lens supported for movement relative to said housing, an alignment structure for aligning said pre-scan lens carrier comprising:

a beam splitter located along the path of a laser beam originating from said laser diode and passing through said collimation assembly and said pre-scan lens, said beam splitter forming said laser beam into first and second beam portions; and first and second sensors for sensing a spot size of each of said first and second beam portions, a desired position for said pre-scan lens carrier is determined based on said spot sizes of said first and second beam portions.

2. An alignment structure as set forth in claim 1, further comprising a processor for determining a location of a waist of said laser beam relative to a known location of a surface of a corresponding photoconductive member based on said spot sizes of said first and second beam portions.

3. A method of adjusting a pre-scan lens in a laser scanning unit comprising a housing, a scanning assembly including a scanning device, a laser diode for generating a laser beam, a collimation assembly for substantially collimating said laser beam and a pre-scan structure comprising the pre-scan lens which is supported for movement relative to said housing, the method comprising the steps of:

positioning a beam splitter in the path of a laser beam originating from said laser diode and passing through said collimation assembly and said pre-scan lens, said beam splitter forming said laser beam into first and second beam portions;

providing first and second spaced-apart sensors for sensing the spot size of each of said first and second beam portions; and moving said pre-scan lens relative to said housing to obtain a laser beam waist at a predetermined location.

4. The method of claim 3, further comprising the step of determining a location of said waist of said laser beam relative to a known location of a surface of a corresponding photoconductive member based on said sensed spot sizes of said first and second beam portions.

* * * * *

UNITED STATES PATENT AND TRADEMARK OFFICE
CERTIFICATE OF CORRECTION

PATENT NO. : 6,836,280 B2
DATED : December 28, 2004
INVENTOR(S) : Cannon et al.

It is certified that error appears in the above-identified patent and that said Letters Patent is hereby corrected as shown below:

Title page,
Item [75], delete "Christopher Chee"

Signed and Sealed this

Fifth Day of April, 2005

JON W. DUDAS
*Director of the United States Patent and Trademark Office*